(No Model.)

W. A. CONNELLY.
GALVANIC BATTERY AND ELECTRICAL TOY INSTRUMENT.

No. 498,743. Patented May 30, 1893.

Witnesses.
R. Henry Marsh
J. Murphy

Inventor.
William A. Connelly
By Jas. H. Churchill
Atty.

UNITED STATES PATENT OFFICE.

WILLIAM A. CONNELLY, OF BOSTON, MASSACHUSETTS, ASSIGNOR TO THE ELECTRO-NOVELTY COMPANY, OF PORTLAND, MAINE.

GALVANIC BATTERY AND ELECTRICAL TOY INSTRUMENT.

SPECIFICATION forming part of Letters Patent No. 498,743, dated May 30, 1893.

Application filed September 1, 1892. Serial No. 444,739. (No model.)

*To all whom it may concern:*

Be it known that I, WILLIAM A. CONNELLY, of Boston, county of Suffolk, and State of Massachusetts, have invented an Improvement in Galvanic Batteries and Electrical Toy Instruments, of which the following description, in connection with the accompanying drawings, is a specification, like letters and figures on the drawings representing like parts.

This invention relates to an improvement in galvanic batteries especially adapted for use with an electrical toy instrument substantially such as shown and described in another application, Serial No. 372,296, filed by myself and Lewis H. Rogers.

My present invention has for its object to construct a toy instrument and its actuating battery as will be described, so that the electrical connections between the motor or instrument secured to the cover of the case or box and the battery located within the said case, may be arranged, to permit the battery to be removed for purpose of renewal or cleaning, without removing or detaching the said electrical connections. In accordance with my present invention, the electrical connections made of metallic strips, preferably spring copper, are permanently secured to the under side of the cover and are carried by the same away from the battery terminals or poles, when the cover is lifted or removed from the case, thereby leaving the whole or any part of the battery free to be removed and replaced by a new part. The box or case has secured to the upper side of the box cover, an electrical instrument, preferably a toy motor, which is electrically connected to the contact brushes secured to the under side of the said cover.

The particular features in which my invention consists will be pointed out in the claims at the end of this specification.

Figure 1:
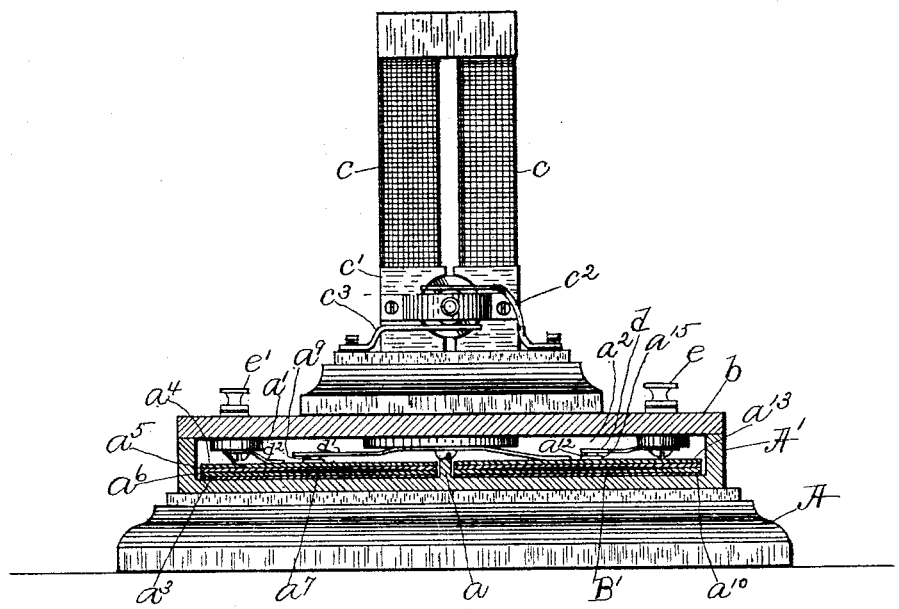
Figure 2:
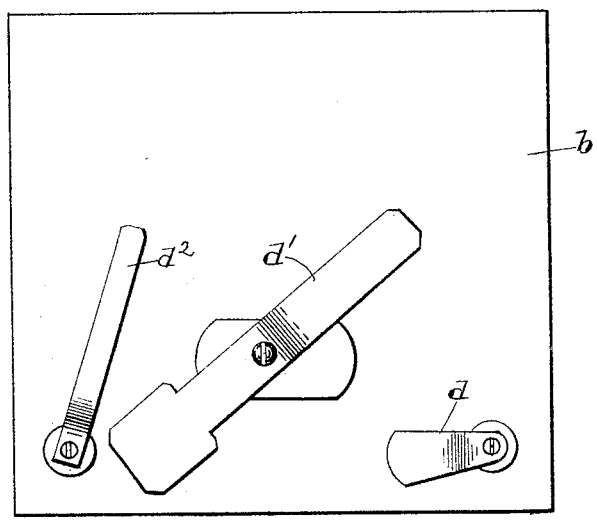
Figure 3:
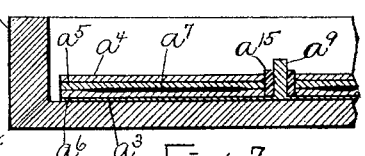

Figure 1 is a partial elevation and section of a galvanic battery embodying my invention, the cover of the said battery having mounted on it a toy motor; Fig. 2, an under side view of the cover of the case to more clearly show the contact springs secured thereto, and, Fig. 3, a detail in section and on an enlarged scale to be referred to.

The base or frame A of wood or other suitable material has secured to or forming part of it, a shallow box or case A' constituting a battery containing cell, it being preferably divided by a partition or wall $a$ into two chambers $a'$ $a^2$, in which are located substantially flat shallow batteries B B' of like construction.

The battery B preferably consists of a copper plate or electrode $a^3$, a zinc plate $a^4$ and an interposed pad, composed of an upper layer $a^5$ of blotting paper or other absorbent material, a lower layer $a^6$ and an intermediate layer $a^7$ of copper sulphate crystals or like electrolytic material, the copper plate or electrode being provided with a metal post or stud $a^9$ extended up through the pad and through a hole or opening in the zinc plate $a^4$. The battery B' is of like construction and its copper plate $a^{10}$ is provided with a metal stud or post $a^{12}$, extended up through the pad and through a hole or opening in its zinc plate $a^{13}$. The posts or studs $a^9$ $a^{12}$ are protected from contact with the zinc plates $a^4$ $a^{13}$ by insulating tubes or pieces $a^{15}$.

I do not herein claim the pad composed of the two layers of absorbent material and the intermediate layer of electrolytic material, as the same forms the subject matter of United States Patent No. 465,206, dated December 15, 1891.

The shallow case or box A' is provided with a top plate or cover $b$ herein shown as secured to the said box or case by hinges $b'$.

The top plate or cover $b$ has firmly secured to it on its upper side a substantially small electric motor, consisting of the field magnets $c$, armature $c'$ and commutator brushes $c^2$ $c^3$ co-operating with the commutator of the said motor. In order to establish electrical connection between the motor on the upper side of the cover and the batteries B B' within the case or box A', and at the same time leave the said batteries free to be removed in whole or in part, to renew or replace one or all of the elements of the battery, the cover or top-plate has secured to its under side, contact springs or devices $d$, $d'$, $d^2$, which co-operate with the poles of the batteries when the cover or top-plate is closed, the contact spring $d$ as herein shown co-operating with the positive pole or post $a^{13}$ of the battery B′, the spring $d'$ with the negative zinc plate of the battery B′ and the positive pole or stud 9 of the battery B, and the spring $d^2$ with the negative plate of the battery B. The contact springs $d$ $d^2$ are connected to binding posts $e$ $e'$ on the cover, the post $e$ having connected to it one end $e^2$ of the field magnet coil, the other end $e^3$ of which is connected to one commutator brush as $c^2$, while the other commutator brush $c^3$ is connected by wire $e^4$ to the binding post $e'$.

The instrument is normally inactive, but when it is desired to use the same, the motor can be set in operation by moistening the pads of the batteries, which can be effected by removing the pads and dipping them in water, the contact springs being independent of the battery and permanently secured to the under side of the cover, permitting the ready removal of the pads without disturbing the rest of the instrument. When the moistened pads are in the position shown and the cover is closed, an electric current is set up, the circuit of which may be traced as follows, viz.— from the zinc plate $a^4$ of the battery B by spring $d^2$, binding post $e'$, wire $e^4$, commutator spring $c^3$ through the commutator to brush $c^2$, thence by wire $e^3$, through the field coils, wire $e^2$, binding post $e$, contact spring $d$, post $a^{12}$, copper plate $a^{10}$, through the pad of battery B′, zinc plate $a^{13}$, spring $d'$ to post $a^9$ of battery B, thence by the copper plate $a^3$, pad of battery B to zinc plate $a^4$.

I claim—

1. In an electrical battery and toy instrument, the combination of the following instrumentalities; viz.—a battery consisting of superimposed positive and negative elements, and an electrolytic material interposed between said elements, the lower element having a stud or post extended up to or above the upper element, a supporting frame or case for said battery, a cover or plate for said frame or case, contact springs or devices permanently secured to the under side of the said plate or cover and engaging the upper element of the battery and the stud or post of the lower element, and an electrical toy instrument secured to the upper side of the top plate or cover and electrically connected to the said contact springs or devices, substantially as described.

2. In an electrical battery and toy instrument, the combination of the following instrumentalities, viz.—a battery consisting of a metallic plate forming one of its poles, a second metallic plate located below the first metallic plate, an electrolytic material interposed between the said metallic plates, and a stud or post secured to the second metallic plate and extended up above the top of the upper metallic plate, a supporting frame or case for said battery, a top plate or cover for said case, contact springs or devices rigidly secured to the under side of the said cover or plate and engaging the upper metallic plate of the battery and the stud or post of the lower metallic plate, and an electric toy motor secured to the upper side of the cover and electrically connected to the contact springs or devices on the under side of the same, substantially as described.

In testimony whereof I have signed my name to this specification in the presence of two subscribing witnesses.

WILLIAM A. CONNELLY.

Witnesses:
JAS. H. CHURCHILL,
J. MURPHY.